US008984737B2

(12) United States Patent
Masser

(10) Patent No.: US 8,984,737 B2
(45) Date of Patent: Mar. 24, 2015

(54) METHOD OF MANUFACTURING KEYCAPS OF KEYS OF A KEYBOARD

(75) Inventor: Paul Masser, Heidelberg (CA)

(73) Assignee: BlackBerry Limited, Waterloo (CA)

( * ) Notice: Subject to any disclaimer, the term of this patent is extended or adjusted under 35 U.S.C. 154(b) by 636 days.

(21) Appl. No.: 13/287,839

(22) Filed: Nov. 2, 2011

(65) Prior Publication Data

US 2013/0105290 A1 May 2, 2013

(51) Int. Cl.
*B23P 17/00* (2006.01)
*H01H 13/83* (2006.01)

(52) U.S. Cl.
CPC ........... *H01H 13/83* (2013.01); *H01H 2219/03* (2013.01); *H01H 2221/07* (2013.01); *H01H 2229/048* (2013.01)
USPC ................ 29/527.1; 29/530; 29/557; 29/558; 200/314

(58) Field of Classification Search
CPC .... B29C 45/16; B29C 45/14; B29C 45/0055; B29C 43/18; H01H 13/705; B29L 2031/466
USPC ................................ 29/527.1, 557, 558, 530
See application file for complete search history.

(56) References Cited

U.S. PATENT DOCUMENTS

| | | | | |
|---|---|---|---|---|
| 6,713,698 | B2 * | 3/2004 | Kashino | 200/341 |
| 7,674,992 | B2 | 3/2010 | Hutchison et al. | |
| 7,700,889 | B2 * | 4/2010 | Wang | 200/345 |
| 7,781,690 | B2 * | 8/2010 | Ishii | 200/341 |
| 2007/0205986 | A1 | 9/2007 | Kim et al. | |
| 2009/0038926 | A1 | 2/2009 | Wang | |

FOREIGN PATENT DOCUMENTS

| | | | |
|---|---|---|---|
| EP | 1349186 | A1 | 10/2003 |
| EP | 1950781 | A1 | 7/2008 |
| WO | 2010119304 | A1 | 10/2010 |

OTHER PUBLICATIONS

European Patent Application No. 11187455.8, Extended European Search Report dated Mar. 16, 2012.
Examiner's Report dated Apr. 16, 2014, issued in respect of corresponding Canadian Patent Application No. 2,791,589.

* cited by examiner

*Primary Examiner* — Sarang Afzali
(74) *Attorney, Agent, or Firm* — Geoffrey deKleine; Borden Ladner Gervais LLP

(57) ABSTRACT

A method for producing a keycap of a keyboard of a portable electronic device that includes removing material from the backside of a body of the keycap to form a cavity in a shape associated with a character, filling the cavity with fill material, and removing material from the front side of the body to expose the fill material on the front surface of the keycap.

11 Claims, 9 Drawing Sheets

METHOD OF MANUFACTURING KEYCAPS OF KEYS OF A KEYBOARD

TECHNICAL FIELD

The present disclosure relates to electronic devices including keyboards.

BACKGROUND DISCUSSION

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart phones may include keypads or keyboards comprising keys associated with characters. Keypads and keyboards may be illuminated by backlighting the keycaps such that the characters displayed on the keys are visible in low light conditions. Metal keycaps may be utilized for such keyboards. Metal keycaps generally include plastic-filled cut outs in the shape of characters to facilitate backlighting.

BRIEF DESCRIPTION OF THE DRAWINGS

Embodiments of the present application will now be described, by way of example only, with reference to the attached Figures, wherein.

DETAILED DESCRIPTION

Figure 1:
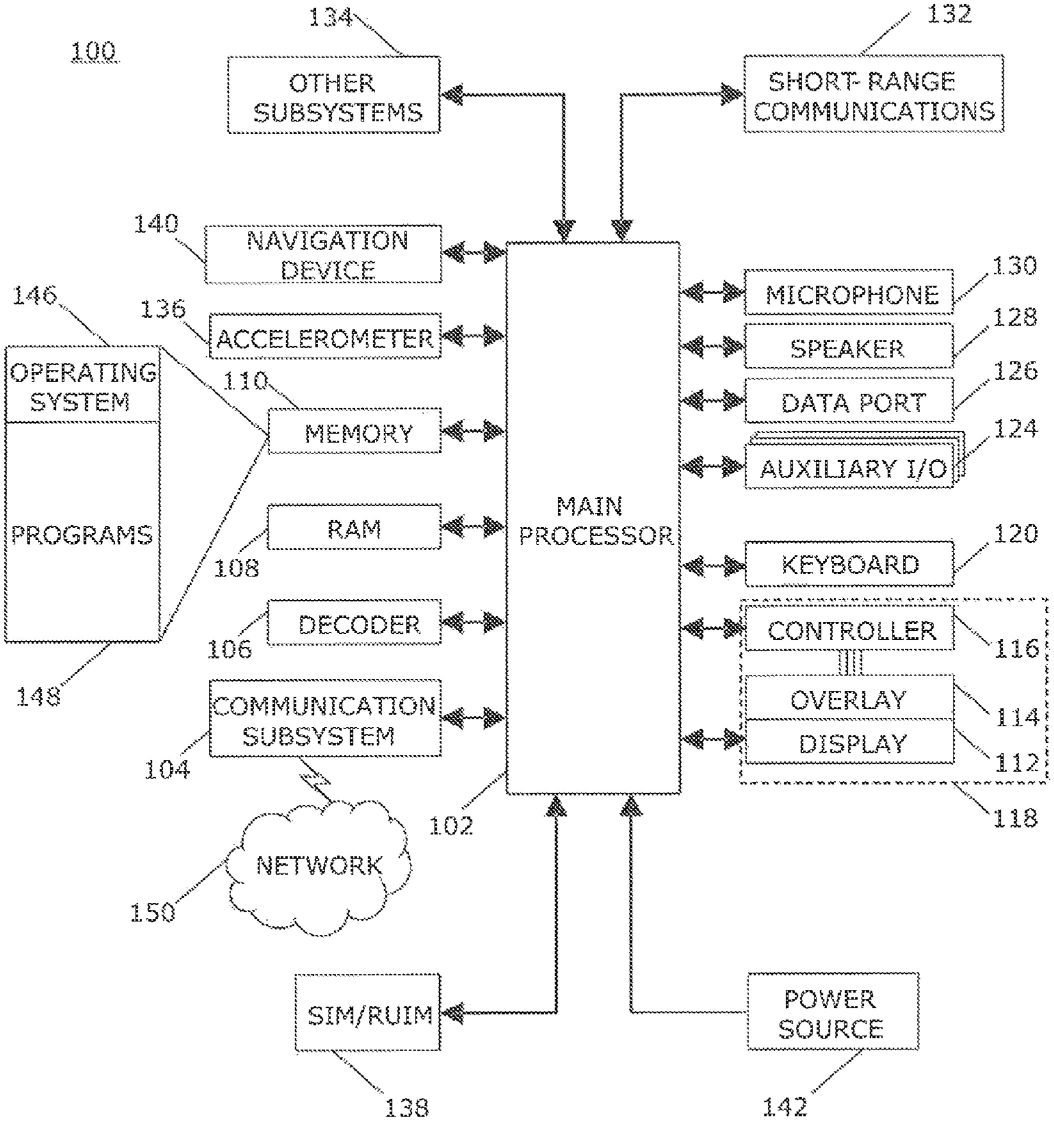
FIG. 1 is a simplified block diagram of one example of a portable electronic device in accordance with the present disclosure.

The following describes an electronic device and a method for producing a keycap of a keyboard of a portable electronic device that includes removing material from a backside of a body of the keycap to form a cavity in a shape associated with a character, filling the cavity with a fill material, and removing material from a front side of the body to expose the fill material on a front surface of the keycap.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, and so forth. The portable electronic device may be a portable electronic device without wireless communication capabilities, such as handheld electronic games, digital photograph albums, digital cameras, media players, e-book readers, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112, a keyboard 120, an auxiliary input/output (I/O) subsystem 124, a data port 126, a speaker 128, a microphone 130, short-range communications 132, and other device subsystems 134. In the example illustrated in FIG. 1, the display 112 is part of a touch-sensitive display 118. Input via a graphical user interface may be provided utilizing the touch-sensitive display 118 or any other suitable device. User-interaction with a graphical user interface may be performed through a touch-sensitive overlay 114 which overlies the display 112. The processor 102 interacts with the touch-sensitive overlay 114 via an electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

The processor 102 also interacts with a navigation device 140 such as a touch-sensitive track pad, a trackball, an optical joystick, and so forth, to interface with a user to provide input. The navigation device 140 may be utilized, for example, to navigate or scroll through information on a display, control a cursor or other indicator, edit information, and so forth. On the portable electronic device 100, the navigation device 140 may be located, for example, between the display 112 and the keyboard 120.

To identify a subscriber for network access, the portable electronic device 100 may utilize a Subscriber Identity Module or a Removable User Identity Module (SIM/RUIM) card

138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. When a touch begins, one or more signals are provided to the controller 116 and the origin of the touch may be determined from the signals. The origin may be a point or an area, for example. Signals may be provided to the controller at regular intervals in time for a touch, also known as sampling, such that changes in location of the touch may be detected. A touch may be detected from any suitable input member, such as a finger, thumb, appendage, or other objects, for example, a stylus, pen, or other pointer, depending on the nature of the touch-sensitive display 118. The controller 116 and/or the processor 102 may detect a touch by any suitable input member on the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 that begins at an origin point and continues to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A hover may be a touch at a location that is generally unchanged over a period of time or is associated with the same selection item for a period of time.

Figure 2:
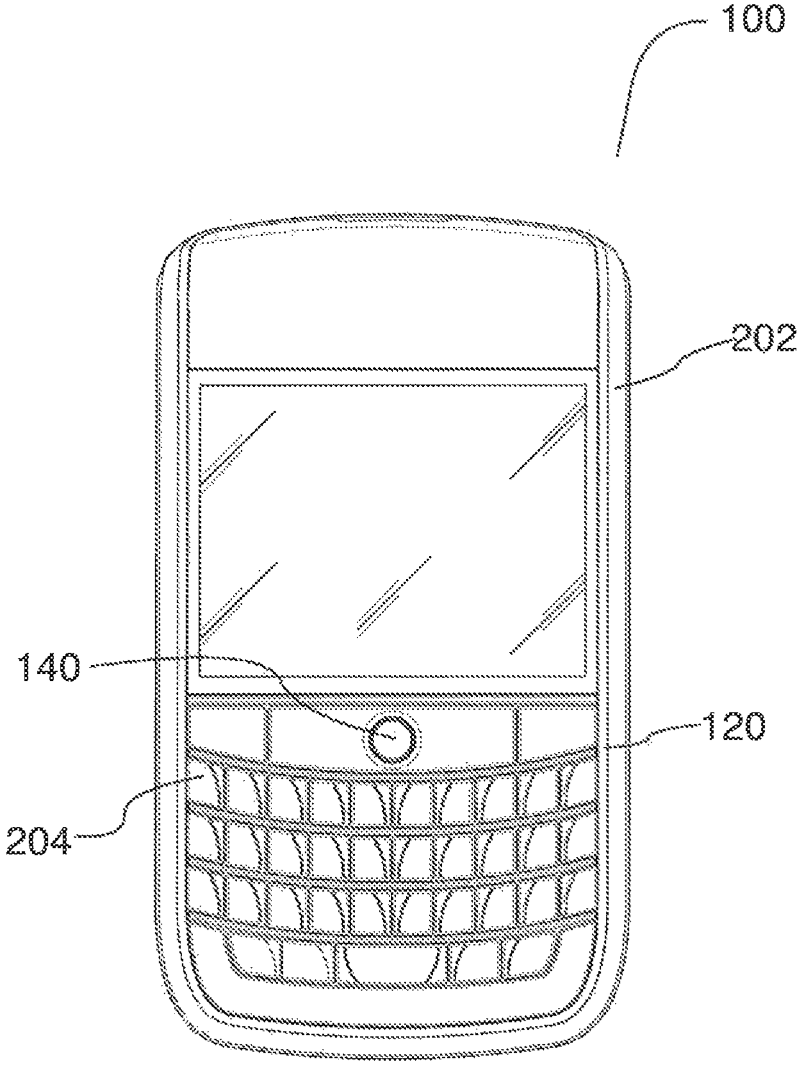
FIG. 2 is a front view of an example of a portable electronic device in accordance with the disclosure.

The keyboard 120 is separate and spaced from the touch-sensitive display 118. The keyboard 120 is a physical keyboard that includes keycaps 204 (FIG. 2). The keyboard 120 may include mechanical keys that provide tactile feedback to a user when the keycaps 204 are depressed. Such mechanical keys may include, for example, mechanical switches disposed under the keycaps 204. Alternatively, the keyboard 120 may include other actuators disposed under the keycaps 204 to provide tactile feedback.

A front view of an example of the electronic device 100 is shown in FIG. 2. The electronic device 100 includes a housing 202 in which the display 112, the navigation device 140, and the keyboard 120 are disposed. The housing 202 is utilized to enclose components such as the components shown in FIG. 1. In the example illustrated in FIG. 2, the keyboard is a full keyboard, such as a QWERTY, QWERTZ, or AZERTY keyboard. Alternatively, the keyboard 120 may be a reduced keyboard that includes fewer keys than a full keyboard, such as a twelve-button telephone keypad.

Each keycap 204 may be associated with one or more characters including letters, numbers, and/or symbols. Each keycap 204 includes an indication or indications, on the keycap 204, of the character or characters associated with the keycap 204.

The keyboard 120 may be backlit using LEDs, or any other suitable light source, located between a back of the housing 202 and the keycaps 204. Light from the light source shines through the keycaps 204 to facilitate utilizing the keyboard 120 in low external light conditions. The keycaps 204 may be selectively backlit such that some keycaps 204 are backlit while other keycaps 204 are not.

Each keycap 204 may comprise a body and fill material. The bodies of the keycaps 204 may include cutouts in the shape of characters that are filled with the fill material. The fill material is discernable from the material of the body such that the fill material imbedded in the body indicates the character or characters associated with the keycap 204 by providing a display of the character on a front surface of the keycap 204.

The fill material may be any material suitable for filling the cutouts in the body. For example, the fill material may be a thermoplastic that is solid at room temperature and a liquid when heated to facilitate filling the cutouts in the bodies of the keycaps 204. Alternatively, the fill material may be a thermoset plastic. The fill material of the keycaps 204 may be a transparent or translucent material, such as plastic, and the bodies of the keycaps 204 may be an opaque material, such as metal or plastic. During backlighting, light from the light source passes through the fill material such that the characters associated with the keycaps 204 are illuminated. Alternatively, the fill material may be opaque while the bodies of the keycaps 204 are translucent, or the bodies and the fill material may be both opaque or both translucent.

Figure 3:
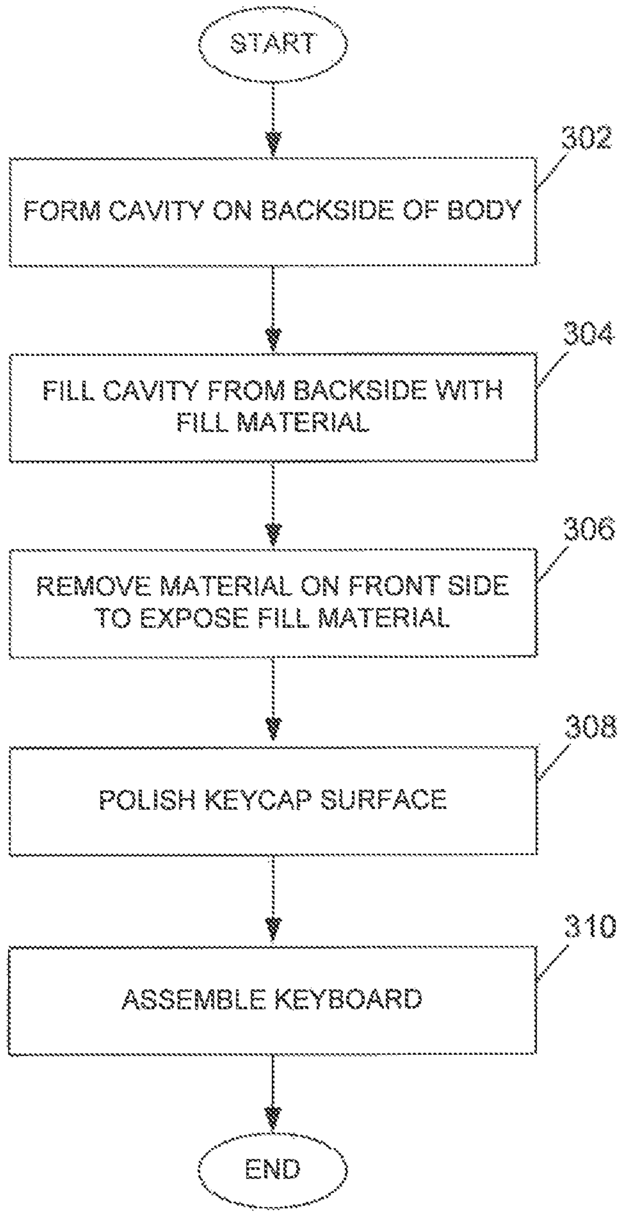
FIG. 3 is a flow chart illustrating a method of producing a keycap in accordance with the disclosure.

A flowchart illustrating a method of producing the keycaps 204 is shown in FIG. 3. A body may be used to produce a single keycap 204 or two or more keycaps 204 joined together.

A character cavity is formed in the body by removing material from the backside of the body, also referred to herein as a first side, at 302. Material may be removed from the body using any suitable method. For example, material may be removed by etching, burning, or machining. The character cavity may extend partially through the thickness of the body toward the front side of the body, without extending through to the front side, or second side. The character cavity may be shaped, on the backside of the body, to provide a mirror image of characters associated with the keycap 204 such that the characters are correctly oriented for display on the front surface of the keycap 204.

A frame may be formed when material is removed from the backside of the body. The frame may extend around the character cavity to produce a frame cavity. The frame cavity extends into the body, toward the front side, to a depth that is less than the depth of the character cavity. The frame reduces the amount of light that is leaked around the backside of the keycap 204 when the keycap 204 is assembled into a backlit keyboard 120.

As will be described in further detail below, bore holes may by formed when material is removed from the backside of the body. Bore holes may extend into the body from the bottom of the character cavity through to the front side of the body. Several bore holes may be distributed throughout the character cavity. For example, bore holes may be spaced at regular intervals along the bottom of the character cavity. Air may escape into the bore holes during filling of the character cavity, reducing the chance of formation of air pockets in the fill material exposed on the front surface of the keycap 204.

The character cavity in the backside of the keycap 204 is filled with a fill material at 304. For a body that includes a frame, filling may include filling the character cavity only, or may include filling the character cavity and the frame cavity. The character and frame cavities may be filled using any suitable method. For example, the fill material may be heated to a liquid state and poured or injected into the character cavity and, optionally, the frame cavity on the backside of the body.

The character cavity and frame cavity may be filled to form a thick layer covering the backside of the body and the excess fill material is removed by any suitable method, such as etching, burning, or machining, to produce a thin keycap 204. Alternatively, the character cavity and, optionally, the frame cavity may be filled such that the backside of the body is covered with fill material to the desired thickness, without excess fill material being applied.

Body and fill material is removed from the front side, or second side, of the body to expose the fill material on the front surface of the keycap at 306. Body and fill material may be removed from the front surface of the body using any suitable method. For example, body and fill material may be removed by etching, burning, or machining. Body and fill material may be removed from the front side of the body to provide a keycap with uniform thickness. Alternatively, body and fill material may be removed from the front surface of the body to provide a keycap with non-uniform thickness such that the front surface of the keycap includes a three dimensional structure. The three dimensional structure on the front surface of the keycap may include, for example, a non-planar or domed surface.

The surfaces of the keycaps 204 may be polished at 308. The keycaps 204 may be polished utilizing any suitable method. The keycaps 204 are assembled into the keyboard of the portable electronic device 100 at 310. Assembling the keycaps 204 may include separating the keycaps 204 in the case that two or more keycaps 204 are produced on a single body. Alternatively, the keycaps 204 may be separated prior to polishing at 308.

Figure 4A:
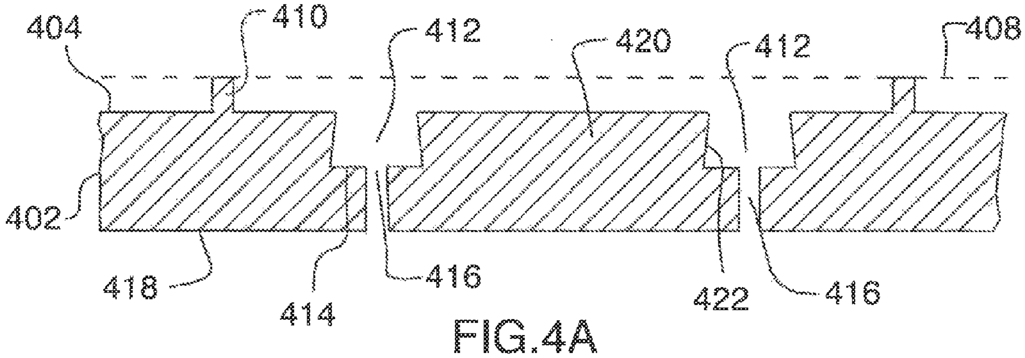
FIG. 4A through FIG. 4C are example cross sectional views illustrating the method of producing a keycap in accordance with the disclosure.
Figure 4B:
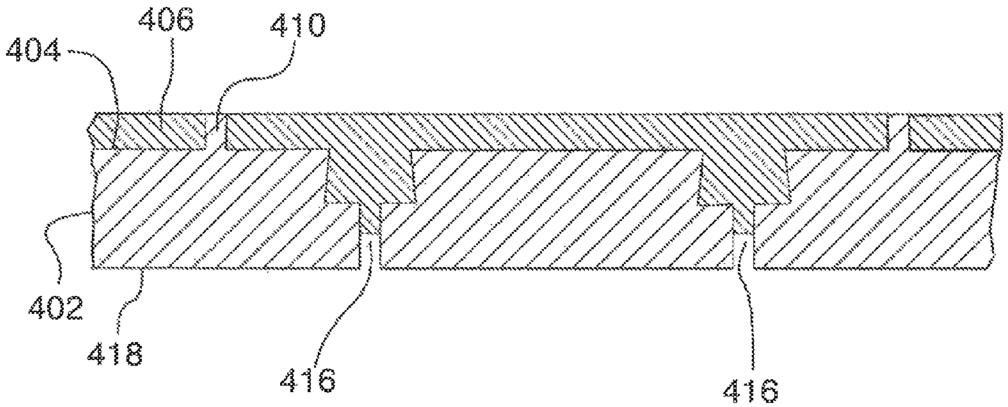
Figure 4C:
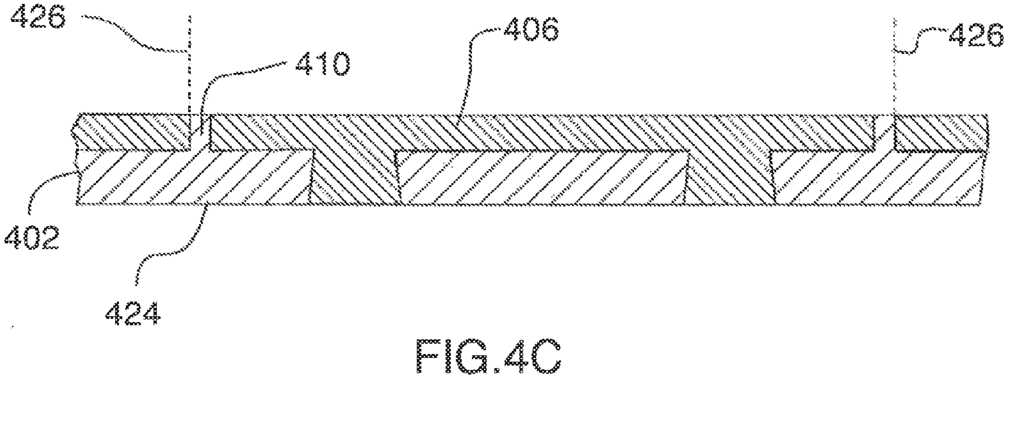

FIG. 4A through FIG. 4C are examples illustrating the method of producing a keycap 204. A cross section of a body 402 after material has been removed from a backside 404 at 302 and before the body is filled with a fill material 406 at 304 is illustrated in FIG. 4A. The back surface of the body 402, prior to material being removed, is illustrated by the dotted line 408. As described above, a frame 410 and a cavity 412 are formed in the body 402 by removing material from the backside 404 of the body 402. The cavity 412 includes a plurality of bore holes 414 that extend from a bottom 416 of the cavity 406 through to a front side 418 of the body 402. The frame 410 extends around the backside of the keycap and may enclose the cavity 412. The frame 410 is utilized to reduce the amount of light leaked when the keycap 204 is backlit. The frame 410 also facilitates retention of fill material 406 when the fill material 406 is heated and poured or injected into the cavity 412 and frame 410.

The cavity 412 may have the shape of a single character, or two or more separate characters. The character may include an island portion 420 that is surrounded by the cavity 412 such as, for example, the center for the letter “O”. Other examples of letters that include island portions 420 are “Q”, “R”, “P”, “A”, “D” and “B”. Because the cavity 412 does not extend all the way through the thickness of the body 402, the island portion 420 is supported by the remaining material on the front side 418 of the body 402.

Sidewalls 422 of the cavity 412 may be undercut such that a width of the cavity 412 increases with increasing depth into the body 402 toward the front side 418, such that the cavity 406 is widest at the bottom 414, as shown in the example illustrated in FIG. 4A through FIG. 4C. Undercutting the sidewalls 422 facilitates retention of the fill material 406 in the cavity 412 and the island portion 420 after the fill material 406 is exposed by removing the material from the front side 418 of the body 402.

A cross section of the body 402 after filling the cavity 412 with the fill material 406 at 304, and before removing material from the front side 418 of the body 402 at 306, is illustrated in FIG. 4B. In the illustrated example, the backside 404 of the body 402 is covered with the fill material 406, filling the cavity 412 up to a top of the frame 410. The fill material 406 may be filled to form a thick layer on the backside 404 of the body 402 and the excess fill material 406 is then removed by, for example, machining such that the fill material 406 is flush with the top of the frame 410, as shown in FIG. 4B. Alternatively, the backside 404 may be filled such that the top of the layer of fill material 406 is below the top of the frame 410, or excess fill material 406 may be removed such that the top of the layer of fill material 406 is below the top of the frame 410.

Air that is trapped in the cavity 412 during filling may enter the bore holes 416. The bore holes 416 reduce the chance that air pockets are entrapped in the fill material 406 that is exposed on the front surface 424 of the keycap 204 when material is removed from the front side 418 the body 402.

A cross section of a body 402 and fill material 406 after body and fill material is removed from the front side 418 to expose the fill material 406 on the front surface 424 of the keycap 204 at 306 is illustrated in FIG. 4C. The fill material 406 exposed on a front surface 424 of the keycap 204 is in the shape of the character associated with the keycap 204.

FIG. 4A through FIG. 4C show a portion 426 of the body 402 surrounding the frame 410. The portion 426 of the body 402 may be part of the keycap 204. Alternatively, when multiple keycaps 204 are produced on the body 402, the portion 426 may be part of the adjacent keycaps 204 and the frame 410 is shared between the adjacent keycaps 204. Alternatively, a single keycap 204 may be formed from a body 402 that is larger than the keycap 204 and the portion 426 is extraneous material that is removed prior to assembling the keyboard 120.

Figure 5A:
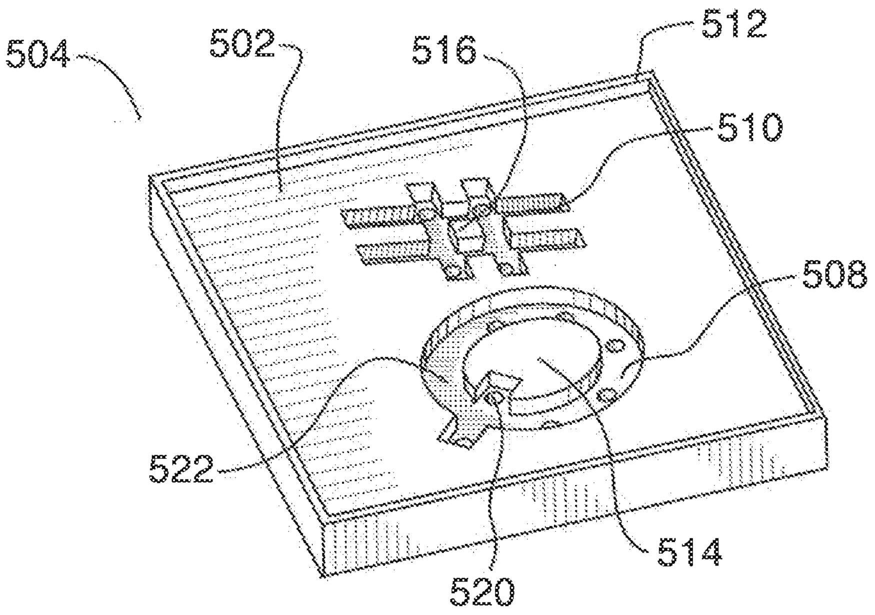
FIG. 5A and FIG. 5B are a perspective view and a backside view, respectively, of an example of a body of a keycap during the method of production in accordance with the disclosure.

An example of a keycap 500 is illustrated in FIG. 5A through FIG. 8B. FIG. 5A and FIG. 5B illustrate a backside 502 of a body 504 of the keycap 500 after material is removed from the body 504 and before filling with a fill material 506.

The body 504 of the example keycap 500 is metal. Alternatively, the body 504 may be a plastic that differs from the fill material 506. Cavities 508, 510 and a frame 512 are formed on the backside 502 by removing material from the body 504. The frame 512 extends around the periphery of the backside 502 of the body 504.

The example keycap 500 shown in FIG. 5A through 8B is associated with the letter "Q" and the symbol "#". The cavities 508, 510 are the shape of the mirror image of the letter "Q" and the symbol "#", respectively. Both the letter "Q" and symbol "#" have island portions 514, 516 at their centers. The island portions 514, 516 are surrounded by the cavities 508, 510. Because the cavities 508, 510 do not extend through to a front side 518 of the body 504, the island portions 514, 516 are supported by the remaining material on the front side 518 of the body 504. The cavities 508, 510 include a plurality of bore holes 520 that extend from bottoms 522 of the cavities 508, 510 through to the front side 518 of the body 504.

Figure 5B:
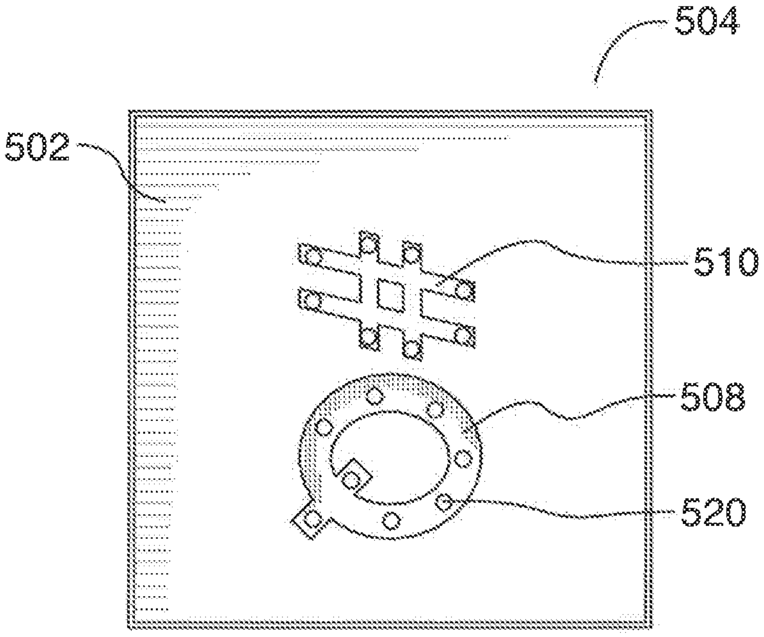
Figure 6:
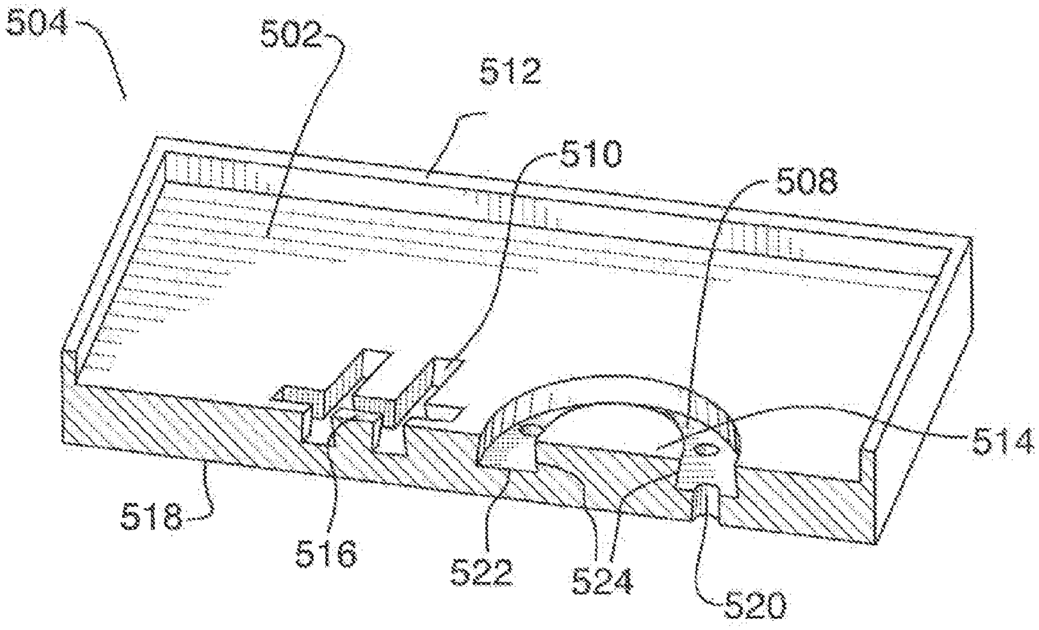
FIG. 6 is a perspective view of a cutaway of the example of the body of the keycap shown in FIG. 5A and FIG. 5B.

FIG. 6 illustrates a perspective view of the backside 502 of a cutaway of the body 504 shown in FIGS. 5A and 5B. FIG. 6 illustrates the depth of the cavities 508, 510 and the bore holes 520 that extend through to the front side 518 of the body 504. FIG. 6 also illustrates that sidewalls 524 of the cavities 508, 510 are undercut such that the widths of the cavities 508, 510 increase as the cavities 508, 510 extend toward the front side 518 of the body 504.

Figure 7A:
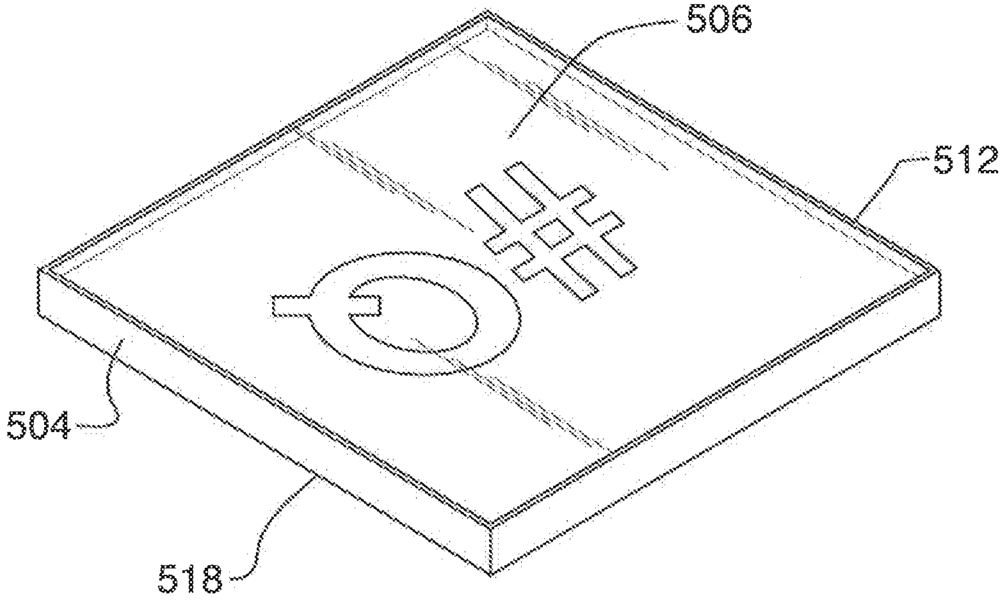
FIG. 7A and FIG. 7B are a perspective view and a backside view, respectively, of the body of a keycap during the method of production in accordance with the disclosure.
Figure 7B:
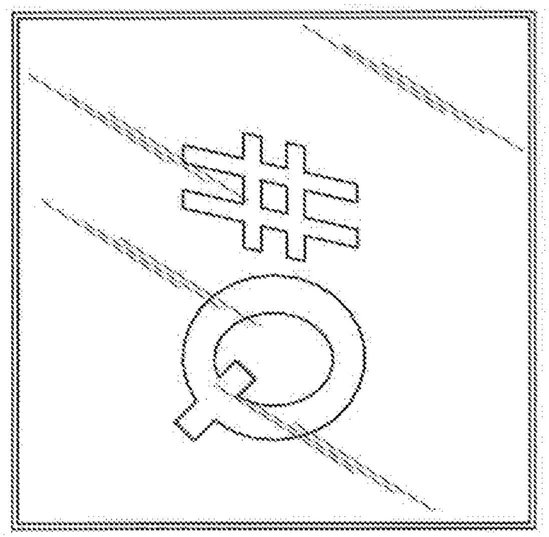

FIG. 7A and FIG. 7B illustrate the backside 502 of the body 504 after the cavities 508, 510 and the frame 512 are filled with the fill material 506. The fill material 506 in the example illustrated in FIG. 7A and FIG. 7B is a translucent plastic and is flush with a top of the frame 512.

Air that is trapped in the cavities 508, 510 when body 504 is filled with the fill material 506 may enter the bore holes 520, reducing the chance of formation of air pockets in the fill material 506 that is exposed when the material on the front side 518 of body 504 is removed.

Figure 8A:
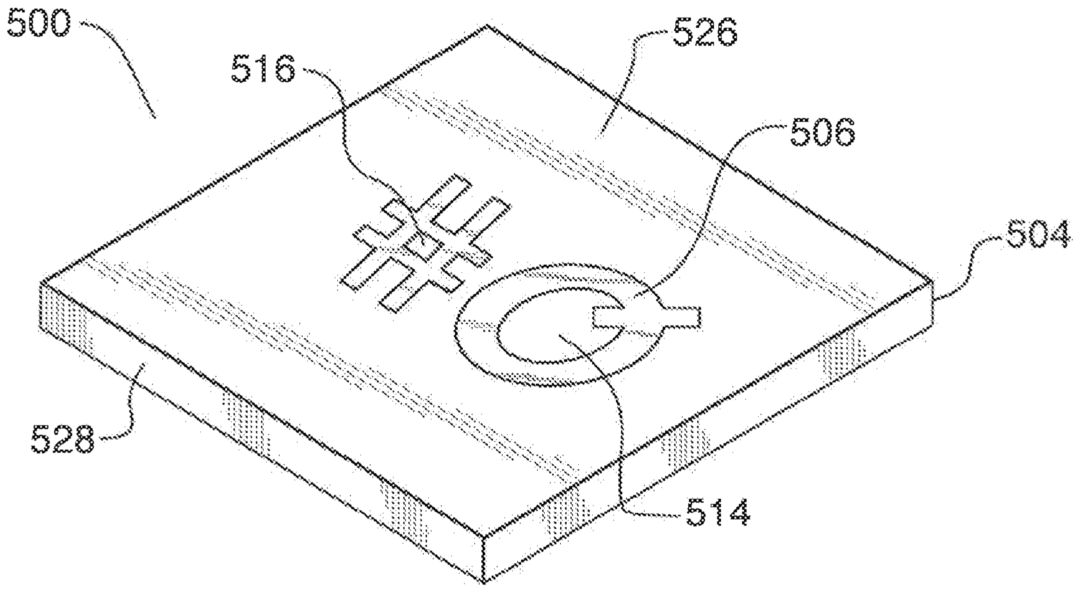
FIG. 8A and FIG. 8B are a perspective view and a front side view of the keycap in accordance with the disclosure.
Figure 8B:
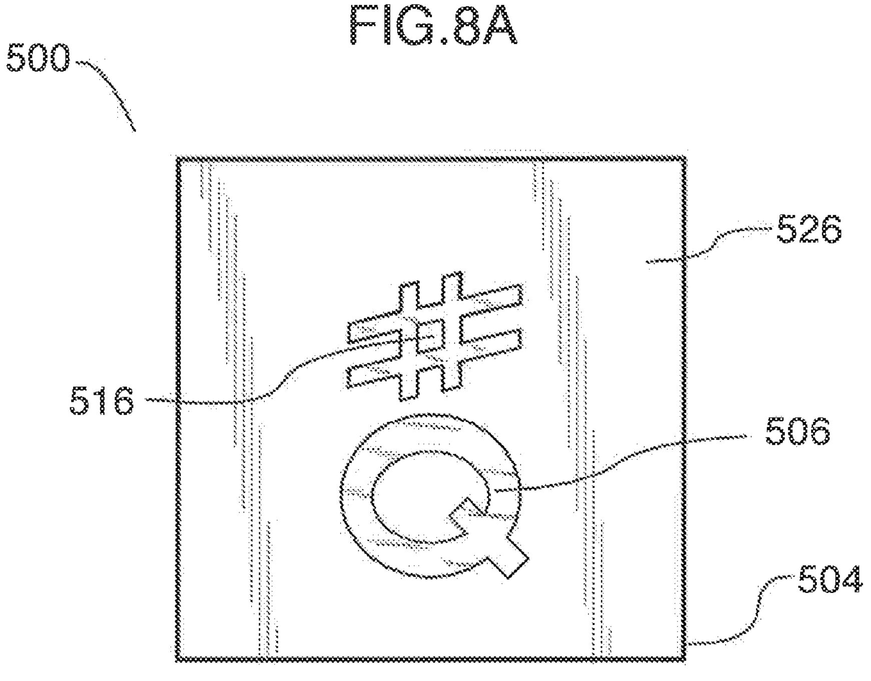

FIG. 8A and FIG. 8B illustrate the front surface 526 of the example keycap 500 after the material on the front side 518 of the body 504 is removed to expose the fill material 506. The exposed fill material 506 is flush with the front surface 526 of the body 504. The exposed fill material 506 is in the shape of the letter "Q" and the symbol "#" on the front surface 526, to indicate the characters associated with the keycap 500. The exposed translucent plastic fill material 506 facilitates passing light through the keycap 500. When the keycap 500 is assembled in a backlit keyboard 120, the fill material 506 is illuminated by the light of the light source located between the keycap 500 and the back of the housing 202, facilitating use of the keyboard 120 in low light conditions.

After material is removed from the front side 518 of body 504, the island portions 514, 516 of the body 504 are supported by the fill material 506. Unlike many conventional keycaps, no bridging or connecting material of the body 504 connects the island portions 514, 516 to the remainder of the body 504.

After material is removed from the front side 518 of body 504, the front surface 526 of the keycap 500 may be polished to reduce any roughness of the front surface. Sides 528 of the keycap 500 may also be polished. The keycap 500 is assembled with other keycaps 204 into a keyboard 120 of a portable electronic device 100.

Figure 9:
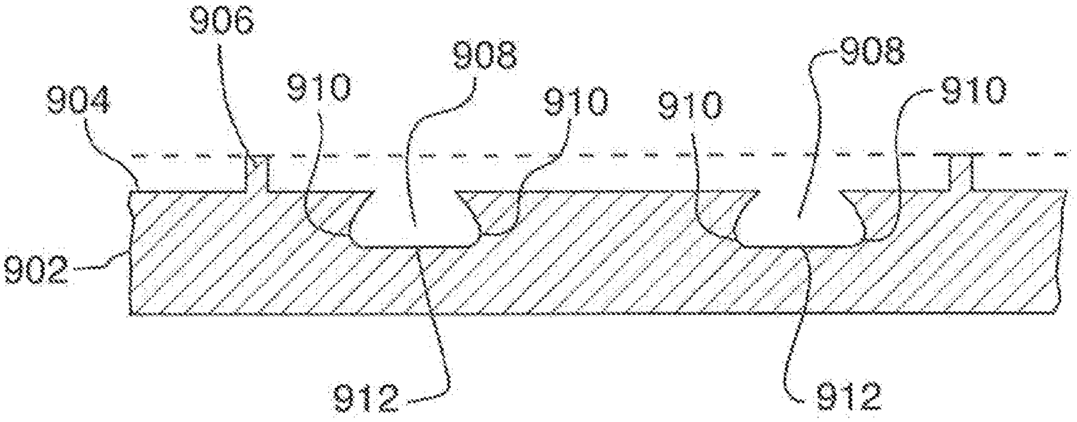
FIG. 9 is an example cross sectional view illustrating the method of producing a keycap in accordance with the disclosure.

An alternative example of a cross section of a body 902 after material has been removed from a backside 904 of the body 902 and before the body 902 is filled with a fill material is illustrated in FIG. 9. Material is removed from the body 902 to form a frame 906 and a cavity 908 having sidewalls 910 and a bottom 912. The sidewalls 910 are undercut such that the cavity 908 has a maximum width at a depth intermediate a backside 904 of the body 902 and a bottom 912 of the cavity 908. The maximum width of the cavity 908 being at an intermediate depth within the cavity 908 facilitates retention of the fill material and island portions 914 within the keycap 204.

Utilizing the method described above, keycaps for a keyboard of a portable electronic device may be produced. The keycaps may be comprised of a body and a fill material. Indications of characters associated with the keycaps are provided by cut outs in the body that are filled with the fill material. The method described produces keycaps with indications of characters that do not have bridging or supporting elements that connect the island portions of characters to the rest of the body of the keycap. Bridging or supporting elements result in characters having a stencil like appearance. Removing these supporting elements after the fill material is formed around them leaves gaps in the fill material, which reduces the transmittance of light through the keycap. Bore holes in the bottom of the cavity reduce the chance of formation of air pockets in the fill material exposed on the front surface of the keycap. Air pockets in the fill material reduce the transmittance of light through the fill material and diminish the quality of the front surface of the keycap. Undercutting the sidewalls of the cavities increases the support of the fill material within the cavities, facilitating retention of the fill material and inhibiting the fill material from being pushed into the body of the keycap. Undercutting the sidewalls also increases the support of the island portions of the keycaps, inhibiting the island portions from detaching from the keycap.

According to one example, a method for producing a keycap includes removing material from a backside of a body of the keycap to form a cavity in a shape associated with a character, filling the cavity with a fill material, and removing material from a front side of the body to expose the fill material on a front surface of the keycap.

According to another example, a portable electronic device includes a keyboard having a plurality of keycaps, where at least one of the keycaps is manufactured by removing material from a backside of a body to form a cavity in a shape associated with a character, filling the cavity with a fill material, and removing material from a front side of the body to expose the fill material on a front surface of the keycap.

According to another example, a method for producing a keycap includes removing material from one side of a body to form a cavity in a shape of a character such that the cavity does not extend through the body to an other side of the body, filling the cavity with a fill material, and removing material from the other side of the body to expose the fill material on the other side of the body.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method for producing a keycap for a backlit keyboard of an electronic device, the method comprising:

removing a first portion of a material from a backside of a body to form a cavity in a shape associated with a character;

filling the cavity with a translucent fill material;

removing a second portion of the material from a front side of the body to expose the translucent fill material on a front surface of the body; and polishing the front surface of the body after removing material from the front side of the body to provide a keycap with a smooth finished front surface;

wherein when the keycap with the smooth finished front surface is assembled into the backlit keyboard, the backside of the body of the keycap is disposed adjacent a light source to illuminate the translucent fill material from the backside.

2. The method of claim 1, wherein two or more keycaps are produced from the body.

3. The method of claim 2, comprising separating the two or more keycaps after polishing the front surface of the body.

4. The method of claim 1, wherein a bottom of the cavity comprises at least one bore hole extending through to the front side of the body.

5. The method of claim 1, wherein removing the first portion of the material further comprises forming the cavity having a cavity width that is greatest at a depth intermediate the backside and the front side of the body.

6. The method of claim 1, wherein removing the first portion of the material from the backside of the body comprises undercutting the first portion of the material to form non-parallel cavity walls to facilitate mechanical retention of the translucent fill material within the cavity.

7. The method of claim 1, wherein the translucent fill material is a plastic to facilitate passage of light through the body.

8. The method of claim 1, wherein removing the first portion of the material from the backside of the body comprises removing material adjacent to the cavity to provide a frame extending around the cavity.

9. The method of claim 1, wherein filling the cavity comprises forming a layer of the fill material over the backside of the body, and, after forming the layer, decreasing a thickness of the layer by removing a portion of the translucent fill material from the backside of the body.

10. The method of claim 1, wherein removing the second portion of the material from the front side comprises removing material such that the body has a non-uniform thickness.

11. The method of claim 1, wherein the body is a metal.

* * * * *